J. COSGROVE & S. F. WELCH.

DRAG SCRAPER.

No. 10,090. Reissued Apr. 25, 1882.

WITNESSES

E. L. Nottingham,

Herman Moran.

INVENTOR

James Cosgrove.

S. Frank Welch.

By H. A. Seymour. Attorney

N. PETERS. Photo-Lithographer, Washington, D. C.

UNITED STATES PATENT OFFICE.

JAMES COSGROVE AND S. FRANK WELCH, OF MOUNT PLEASANT, IOWA.

DRAG-SCRAPER.

SPECIFICATION forming part of Reissued Letters Patent No. 10,090, dated April 25, 1882.

Original No. 243,515, dated June 28, 1881. Application for reissue filed March 3, 1882.

*To all whom it may concern:*

Be it known that we, JAMES COSGROVE and S. FRANK WELCH, of Mount Pleasant, in the county of Henry and State of Iowa, have invented a new and valuable Improvement in Drag-Scrapers; and we do hereby declare that the following is a full, clear, and exact description of the construction and operation of the same, reference being had to the annexed drawings, making a part of this specification, and to the letters and figures of reference marked thereon.

Our invention relates to road-scrapers of that class in which a scraper-box with handles at its rear end is drawn by a draft bail or chain at its forward end, and is adapted to be turned over forward upon the draft-bail or sidewise by means of a swivel attached to the forward end of the draft-bail to discharge the load; and the invention consists in a scraper-box formed of a blank of suitable material, and made with curved surfaces at the juncture of its bottom with its back and sides, and the ends of the back made to overlap the sides.

Our invention further consists in a scraper-box formed of a blank of suitable material, which may be bent into shape to form a strong box, with the material which forms the back of the scraper-box bent or lapped over on the outside or inside of the sides of the box at the rear corners of the same to join the back to the sides of the scraper in such manner as to give unity and strength to the box, the handles being attached thereto by plates or clips, in conjunction with bolts or rivets, the whole being intended to answer the twofold purpose of securing the corners of the box and strengthening the point of attachment of the handles thereto.

Our invention further consists in a scraper-box having a flat bottom, with a single plate of pressed metal attached thereto and extending nearly across the scraper-bottom in both a longitudinal and lateral direction to strengthen and protect it, and having two parallel rockers or runners pressed or stamped into the metal to form a curved protuberance running from front to rear of said plate, and said rockers or runners being curved in a lateral direction to form an undulating surface from side to side of said plate, the whole being intended to facilitate the raising and lowering of the scraper while loading or unloading, and to allow of an even, steady motion while being hauled with a load, as will be hereinafter fully described, and particularly pointed out in the claims.

Figure 1:
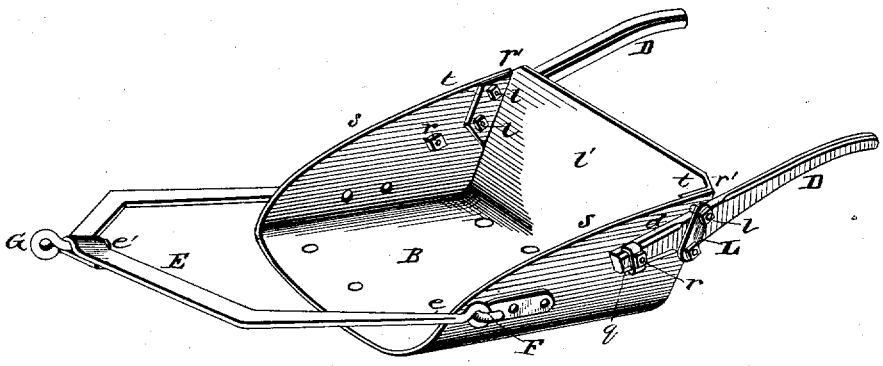
Figure 2:
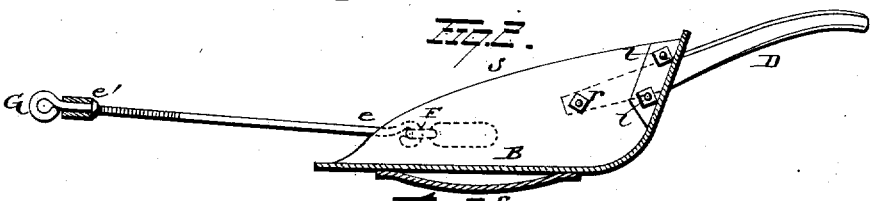
Figure 3:
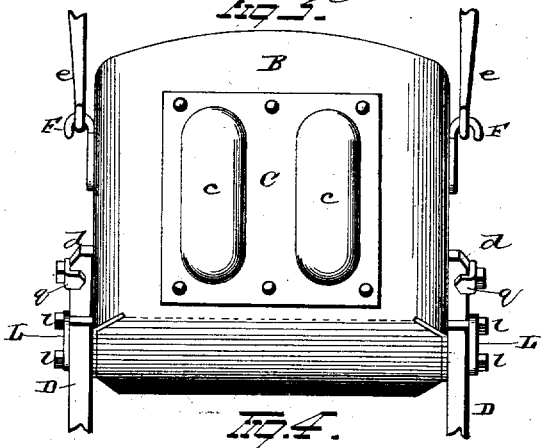

In the accompanying drawings, Figure 1 is a view in perspective of a road-scraper embodying our invention. Fig. 2 is a sectional view of the same. Fig. 3 is a bottom view, and Fig. 4 is a developed view of the blank.

Figure 4:
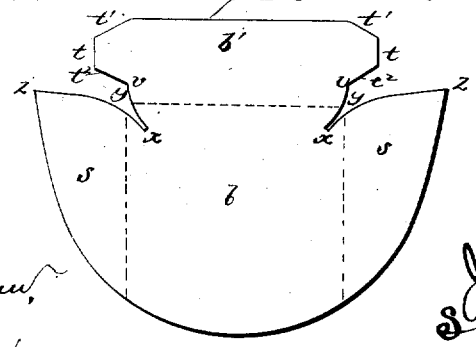

A designates the drag-scraper, the scraper-box B of which is formed from a single plate, *b*, of steel or other suitable metal cut into a blank or form, as shown in Fig. 4. The sides *s s* of the blank are bent upward on the vertical dotted lines in Fig. 4 to form a curve with the bottom of the scraper, as represented in Figs. 1 and 3, and the rear part or back, *b'*, is bent up along the horizontal dotted line in said Fig. 4 to form a curve with the bottom of the scraper, as illustrated in Figs. 2 and 3, and in like manner as the sides thereof. To provide for the curved portions at the juncture of the bottom with the back and sides of the scraper-box, the blank is cut in the manner shown in Fig. 4. Each rear corner of the flat bottom *b* is cut from the point *x*, located within the dotted lines, outwardly on diverging curved lines, one edge of the cut-away portion constituting the rear edge of the side *s* of the scraper-box and the other the end of the back *b'*. The end of the scraper-back is formed on a curve to the point *v*, and then an outwardly-projecting flap $t^2\ t\ t'$ is formed, which, when bent forward as represented in Fig. 1, overlaps the inside or outside of the rear end of the side of the scraper-box to unite and strengthen the box at the corners *r' r'*, to which the handles D D are secured by the tie plates or clips L L *q q* in conjunction with bolts or rivets *l l r r*. By this construction the corners *r' r'* are secured and the handles D D secured to the corners by the same set of bolts or rivets, while a curved surface is insured at the juncture of the bottom *b* with the back *b'* and sides *s s* of the scraper-box.

E designates an ordinary draft-bail attached to the outside of the scraper-box near the front by ordinary lugs, F F.

C designates a plate, preferably of steel, pressed or stamped into shape, so as to form two parallel runners or rockers, *cc*, curved from front to rear of the plate C, said runners or rockers *c c* being also curved from near the center (longitudinally) of the plate to near the sides thereof in an undulating or convex form, as shown in Fig. 3, thus forming an undulating surface from front to rear and from side to side of the plate C, except at the extreme edges, which lie flat and close to the bottom of the scraper-box for the purpose of preventing earth or other substances from entering and lodging between the plate C and the bottom of the scraper-box. The plate C, by reason of its undulating and curved surfaces, is subject to friction throughout its entire area, thus preventing the clogging of dirt at any portion of the surface thereof, and allowing of a free and steady motion while in the process of loading or while being hauled with a load. The plate C extends nearly across from side to side and from front to rear of the bottom of the scraper-box, and is attached at its front and rear ends to the bottom of the scraper by rivets, thereby strengthening and stiffening the bottom of the scraper-box and preventing the wearing of the same while in use. The plate C, by means of it rockers or runners, facilitates the forcing of the forward end of the scraper into the ground, tipping and turning it, and raising the forward end from the ground after filling.

G designates an eye on a swivel-bolt in the draft-bail, which facilitates the turning of the scraper from side to side.

By providing the curved surfaces at the juncture of the bottom with the sides and back of the scraper the scraper will fill with greater ease than is the case when the bottom and sides are straight, as the dirt will not stick in entering the scraper, and instead of being forced squarely against the back will follow the curve of the bottom and back, thereby relieving the pressure of the dirt against the back, and thus allowing the scraper to fill with greater ease to the team, and also by reason of the curved sides and back at their juncture with the bottom the dirt will not lodge and stick in the box when it is dumped.

Having fully described our invention, what we claim as new, and desire to secure by Letters Patent, is—

1. A scraper-box formed of a blank of suitable material, and made with curved surfaces at the juncture of its bottom with its back and sides, and the ends of the back constructed to overlap the rear ends of the sides, substantially as set forth.

2. A scraper-box formed of a blank cut and the ends of its rear portion, *b'*, and sides, *s*, bent as described, in combination with the bolts or rivets *l l r r*, plates or clips L L and *q q*, and the handles D D, substantially as described, and for the purposes specified.

3. In combination with the scraper-box, the plate C, having the runners *c c*, substantially as and for the purposes set forth.

In testimony whereof we have signed this specification in the presence of two subscribing witnesses.

JAMES COSGROVE.
S. FRANK WELCH.

Witnesses:
ABRAM WELCH,
CHARLES C. WELCH.